United States Patent [19]

Blaskowski

[11] 4,212,160

[45] Jul. 15, 1980

[54] COMBINED CYCLE POWER PLANT USING LOW BTU GAS

[75] Inventor: Henry J. Blaskowski, West Simsbury, Conn.

[73] Assignee: Combustion Engineering, Inc., Windsor, Conn.

[21] Appl. No.: 863,390

[22] Filed: Dec. 22, 1977

[51] Int. Cl.² .......................... F02B 43/08; F02C 7/02
[52] U.S. Cl. .................................. 60/39.12; 60/39.18 B
[58] Field of Search .................. 60/39.12, 39.18 B; 55/73

[56] References Cited

U.S. PATENT DOCUMENTS

| | | | |
|---|---|---|---|
| 3,020,715 | 2/1962 | Thomsen | 60/39.12 |
| 3,203,175 | 8/1965 | Michalicka et al. | 60/39.18 B |
| 3,804,606 | 4/1974 | Archer et al. | 60/39.12 |
| 3,990,229 | 11/1976 | Staege | 60/39.18 B |
| 4,078,390 | 3/1978 | Duvall | 55/73 |

*Primary Examiner*—Louis J. Casaregola
*Attorney, Agent, or Firm*—Robert L. Olson

[57] ABSTRACT

A combined cycle electric power generating plant having a steam generator and a gas turbine in which low Btu gas from a coal gasifier is the fuel. The gas turbine drives the compressors for both the air and low Btu gas used to generate the hot combustion gases therein. In addition, the oxygen-containing exhaust gases from the gas turbine are used to support combustion of the fuel in the steam generator.

1 Claim, 1 Drawing Figure

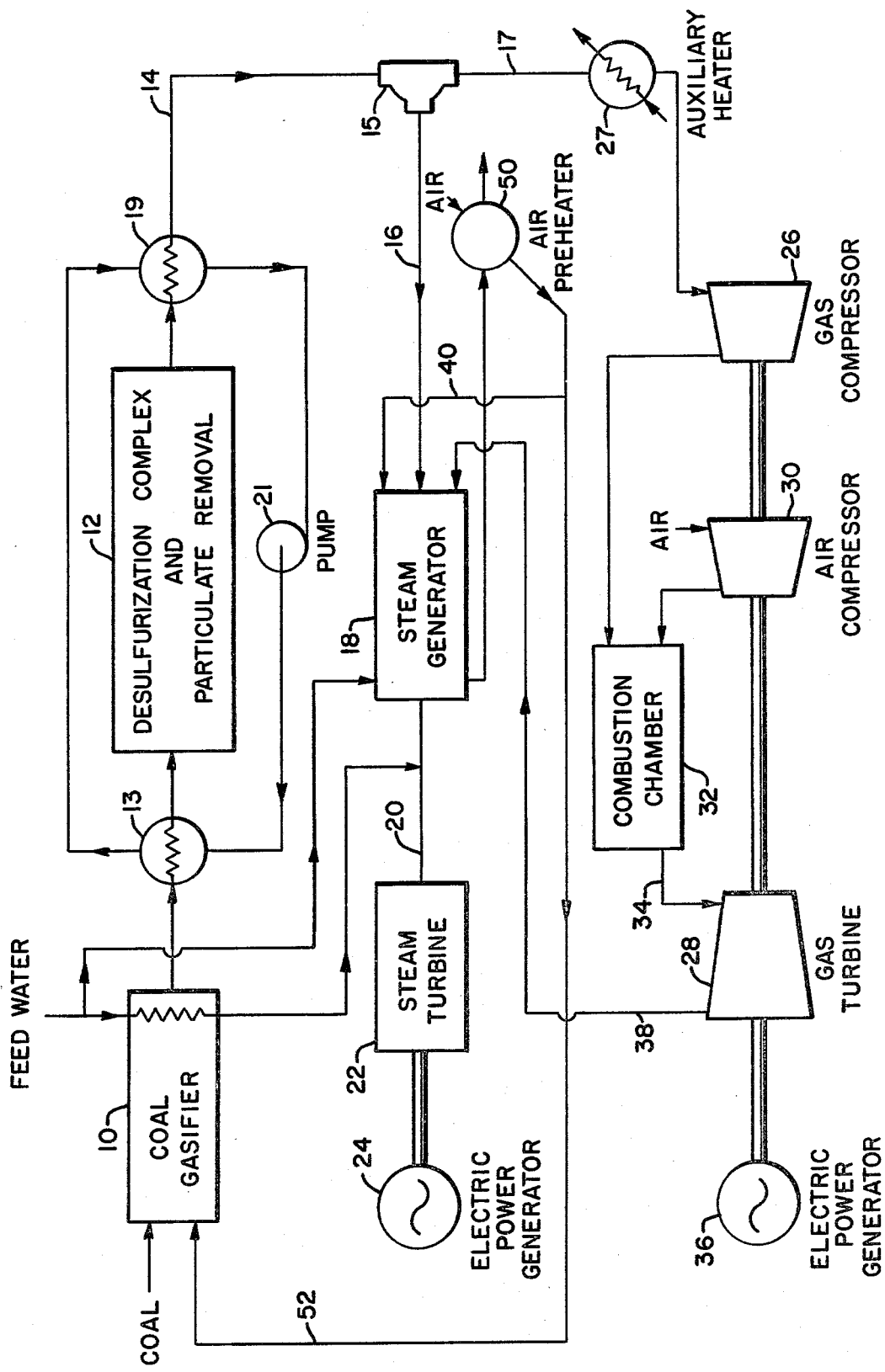

COMBINED CYCLE POWER PLANT USING LOW BTU GAS

BACKGROUND OF THE INVENTION

Gas turbines have been used in electric power generating plants, in combination with conventional steam power plants. One such arrangement is shown in my U.S. Pat. No. 3,849,662, entitled "Combined Steam and Gas Turbine Power Plant Having Gasified Coal Fuel Supply", which issued on Nov. 19, 1974. In that arrangement, the steam generator is fired continuously with low Btu gas, such as from a coal gasifier, to generate electricity at a constant rate. Excess gas from the coal gasifier is compressed and stored in a storage tank, and during peak periods of electrical demand, it is combusted and used to drive a gas turbine to generate the peak electricity required. With a large storage tank necessary, and also with the gas turbine only being used intermittently, it is a somewhat inefficient power plant with large capital cost. The overall efficiency of a gas turbine is on the order of 75 percent when the residual heat in the exhaust gases is used, while the overall efficiency of a steam generator-turbine is 35–40 percent.

SUMMARY OF THE INVENTION

In accordance with the invention a combined cycle electric power generating plant is provided having a steam generator and a gas turbine in which low Btu gas from a coal gasifier is the fuel. The gas turbine drives the compressors for both the air and low Btu gas used to generate the hot combustion gases therefore. In this manner, one or the other of the two electric generators can be taken off the line, while the other one continues to produce electricity. Also, the oxygen-rich exhaust gases from the gas turbine are used to support combustion of the fuel in the steam generator. The gas turbine driven electrical generator is designed to produce at least 20 percent of the overall electrical power, and this, in combination with the recovery of the residual heat from the gas turbine exhaust gases by using it to support combustion of the fuel in the steam generator, provides an efficient overall electrical power plant.

BRIEF DESCRIPTION OF THE DRAWING

The drawing is a schematic of a combined gas turbine, steam generator, electrical power generating plant constructed in accordance with the invention.

DESCRIPTION OF THE PREFERRED EMBODIMENT

Referring to the drawing, numeral 10 designates a coal gasifier for producing a low Btu gaseous fuel. This gasifier is an entrainment type gasifier in which pulverized coal, air and steam are reacted, in suspension, at a high temperature to form a fuel gas containing primarily carbon monoxide and hydrogen, having a Btu value of 100–125 Btu/Cu. Ft. The gasifier of course may be one of the other well known types such as a fixed bed or fluidized gasifier. The gas produced in the gasifier, after being cleaned of particulate matter, is passed to a desulfurization complex 12 where sulfur compounds, such as hydrogen sulfide, are removed by means of any several well-known processes such as solvent absorption, or a dry absorption process. Prior to passing through the desulfurization process 12, the gas is passed through a heat exchanger 13, where water absorbs heat therefrom. This heat is put back into the gases in heat exchanger 19. The water is pressurized and circulated in a closed loop between the two heat exchangers by means of pump 21. This is done to save the heat in the gases, since they are greatly reduced in temperature during the cleanup process accomplished in complex 12.

The gas exiting from the desulfurization complex 12 and heat exchanger 19 passes via a conduit 14 to the valve 15, which sends a proportional amount, such as 75 percent to the conduit 16, and the other 25 percent to the conduit 17. The gas in conduit 16 flows to a steam generator 18 where it is fired to produce heat and thereby generate steam in the boiler. Steam from the steam generator 18 combines with steam generated in the coal gasifier 10 and is directed through a conduit 20 to a steam turbine 22 to drive the turbine, which in turn drives the electrical generator 24, thereby producing electricity.

The fuel in conduit 17 flows to a gas compressor 26 driven by a gas turbine 28. Heat is removed from these gases in an auxiliary water heat exchanger 27. Since it takes more energy to compress hot gases, it is desirable to remove the heat from the gases in line 17. The turbine 28 also drives an air compressor 30. The compressed gas and air are introduced to a combustion chamber 32, with the resultant hot combustion gases flowing therefrom via conduit 34 to the gas turbine 28. This turbine in turn drives an electrical generator 36 to produce electricity. Since gas turbines are limited as to the temperature they can withstand (1800° F. presently being about maximum) excess air is introduced into the combustion chamber 32, to keep the temperature of the combustion gases near this level. The high mass of the low Btu gas reduces the excess air requirement to maintain the same volume and gas turbine entering temperature required for the same output that would be obtained with a richer gas, such as natural gas. The oxygen-rich gases leaving the gas turbine 28 then are passed through the steam generator through duct 38 to support combustion therein. In this manner, the residual heat in these gases is recovered in the steam generator.

The exhaust gases leaving the steam generator 18 pass through an air preheater 50 before being discharged to the atmosphere. The heated air is passed to the coal gasifier through 52. Also, if more air is needed in the steam generator 18 to support combustion therein, it is supplied via duct 40.

From the above, it can be seen that a low cost, highly efficient power plant is provided. Because both the steam generator and the gas turbine arrangement are self-sufficient, either one or the other can be shut down for maintenance while the other continues to operate, if necessary. The coal gasifier is then operated at less than full load capacity. If the gas turbine is shut down, naturally, all of the combustion air is supplied through duct 40.

I claim:

1. An electric power generating plant comprising a coal gasification complex for producing a gaseous fuel, a gas cleanup complex downstream of the coal gasification complex, a first heat exchanger between the coal gasification complex and the gas cleanup complex for removing heat from the gaseous fuel, and a second heat exchanger located downstream of the gas cleanup complex for restoring the removed heat back to the gaseous fuel, a first steam generator fired by said gaseous fuel, a steam turbine receiving steam from said first steam generator, a first electric power generator connected to and driven by said steam turbine, a gas turbine fired by said gaseous fuel, said gas turbine comprising an air compressor, a gas compressor, a combustion chamber, and a turbine section, with both the air and gas compressors being driven by the gas turbine, a second electric power generator connected to and driven by said gas turbine, means for introducing the hot, oxygen-rich exhaust gases from the gas turbine to the first steam generator, a second steam generator associated with the coal gasification complex, means for transporting steam from the coal gasification complex to the steam turbine, an air preheater where air is heated by the combustion exhaust gases of the first steam generator and means for transporting heated air from the air preheater to both the first steam generator and the coal gasification complex.